(12) United States Patent
Bartoszek

(10) Patent No.: US 9,435,084 B2
(45) Date of Patent: Sep. 6, 2016

(54) PAVING MACHINE

(71) Applicant: Northeast Asphalt, Inc., Waukesha, WI (US)

(72) Inventor: John C. Bartoszek, Wrightstown, WI (US)

(73) Assignee: Northeast Asphalt, Inc., Waukesha, WI (US)

( * ) Notice: Subject to any disclaimer, the term of this patent is extended or adjusted under 35 U.S.C. 154(b) by 7 days.

(21) Appl. No.: 14/301,903

(22) Filed: Jun. 11, 2014

(65) Prior Publication Data

US 2014/0363231 A1    Dec. 11, 2014

Related U.S. Application Data

(60) Provisional application No. 61/833,648, filed on Jun. 11, 2013.

(51) Int. Cl.
| | |
|---|---|
| *E01C 19/48* | (2006.01) |
| *E01C 7/18* | (2006.01) |
| *E01C 11/02* | (2006.01) |
| *E01C 19/08* | (2006.01) |
| *E01C 19/17* | (2006.01) |

(52) U.S. Cl.
CPC .............. *E01C 19/48* (2013.01); *E01C 7/185* (2013.01); *E01C 11/02* (2013.01); *E01C 19/08* (2013.01); *E01C 19/17* (2013.01); *E01C 2301/20* (2013.01)

(58) Field of Classification Search
CPC ........ E01C 19/48; E01C 19/08; E01C 19/17; E01C 7/185; E01C 11/02
See application file for complete search history.

(56) References Cited

U.S. PATENT DOCUMENTS

| | | | | |
|---|---|---|---|---|
| 1,802,087 | A * | 4/1931 | McConnaughay | E01C 19/1054 404/118 |
| 4,274,586 | A * | 6/1981 | Hill | E01C 19/176 137/615 |
| 4,780,022 | A * | 10/1988 | Ohiba | E01C 23/065 404/110 |
| 4,934,864 | A | 6/1990 | Mauldin | |
| 4,948,431 | A * | 8/1990 | Strickland | E01C 7/187 106/273.1 |
| 5,213,442 | A * | 5/1993 | Sovik | E01C 7/187 404/102 |
| 5,362,176 | A * | 11/1994 | Sovik | E01C 19/006 404/72 |
| 6,079,901 | A | 6/2000 | Banks et al. | |
| 6,283,672 | B1 * | 9/2001 | Sovik | E01C 19/48 404/118 |
| 7,438,764 | B1 * | 10/2008 | Hill | E01C 19/176 118/313 |
| 7,488,138 | B2 | 2/2009 | Buschmann | |
| 7,588,388 | B2 | 9/2009 | Hall et al. | |

(Continued)

FOREIGN PATENT DOCUMENTS

JP        02302480 A  * 12/1990

*Primary Examiner* — Abigail A Risic
(74) *Attorney, Agent, or Firm* — Michael Best & Friedrich LLP

(57) ABSTRACT

A method of paving a roadway that includes a first lane and a second lane adjacent the first lane includes applying, a first asphalt layer over the first lane of the roadway. The first asphalt layer includes a first side edge defining a portion of a joint between the first asphalt layer and a second asphalt layer. The method also includes smoothing the first asphalt layer on the first lane of the roadway, applying an additive on the first side edge to soften the first side edge, and applying the second asphalt layer over the second lane of the roadway. The second asphalt layer includes a second side edge abutting the first side edge such that the second side edge mixes with the first side edge. The first side edge and the second side edge form the joint between the first asphalt layer and the second asphalt layer.

15 Claims, 10 Drawing Sheets

(56) References Cited

U.S. PATENT DOCUMENTS

| | | |
|---|---|---|
| 7,798,745 B2 | 9/2010 | Hall et al. |
| 7,927,038 B2 | 4/2011 | Dawson et al. |
| 8,061,931 B2 | 11/2011 | Musil |
| 8,172,479 B2 | 5/2012 | Dawson et al. |
| 8,439,597 B2 | 5/2013 | Diamond |
| 8,491,221 B1* | 7/2013 | Hedin .................... E01C 19/48 404/104 |
| 2007/0243017 A1* | 10/2007 | Buschmann .......... E01C 19/176 404/104 |
| 2010/0021233 A1 | 1/2010 | Chandler |
| 2010/0104363 A1* | 4/2010 | Benedetti ............. E01C 23/065 404/75 |
| 2010/0116904 A1* | 5/2010 | Rayner .................. E01C 19/17 239/172 |
| 2012/0253612 A1 | 10/2012 | Byrne |
| 2014/0270953 A1* | 9/2014 | Duffy ..................... E01C 19/48 404/75 |

\* cited by examiner

PAVING MACHINE

BACKGROUND

The present invention relates to paving machines and methods of paving roadways.

SUMMARY

In one embodiment, the invention provides a method of paving a roadway including a first lane and a second lane adjacent the first lane. The method includes applying, with a paving machine, a first asphalt layer over the first lane of the roadway. The first asphalt layer includes a first side edge defining a portion of a joint between the first asphalt layer and a second asphalt layer. The method also includes smoothing, with the paving machine, the first asphalt layer on the first lane of the roadway, applying, with the paving machine, an additive on the first side edge to soften the first side edge, and applying, with the paving machine, the second asphalt layer over the second lane of the roadway. The second asphalt layer includes a second side edge abutting the first side edge such that the second side edge mixes with the first side edge. The first side edge and the second side edge forming the joint between the first asphalt layer and the second asphalt layer. The method also includes smoothing, with the paving machine, the second asphalt layer on the second lane.

In another embodiment, the invention provides a paving machine used to apply a first asphalt layer and a second asphalt layer on a road. The first asphalt layer has a first side edge that defines a portion of a joint between the first asphalt layer and the second asphalt layer. The paving machine includes a frame, a driving mechanism coupled to the frame and configured to propel the paving machine forward, and an asphalt delivery system configured to apply asphalt material on the road. The paving machine also includes a spray assembly coupled to the frame, a pump coupled to the spray assembly, a screed coupled to a back side of the frame and configured to smooth asphalt material applied to the road, and a controller coupled to the driving mechanism, the asphalt delivery system, and the pump. The controller is configured to activate the driving mechanism to propel the paving machine forward at a speed, activate the pump to spray a first additive on the first side edge of the first asphalt layer using the spray assembly, and activate the asphalt delivery system to apply the second asphalt layer on the road. The second asphalt layer has a second side edge abutting the first side edge to form the joint between the first asphalt layer and the second asphalt layer.

In yet another embodiment, the invention provides a method of paving a roadway. The method includes storing an additive on a paving machine, heating the additive such that the additive is maintained at a specified viscosity, and spraying, with a paving machine, the additive on the roadway. The method also includes applying, with the paving machine, an asphalt layer over the roadway, and smoothing, with the paving machine, the asphalt layer on the roadway.

In another embodiment, the invention provides a paving machine used to apply an asphalt layer on a road. The paving machine includes a frame, a driving mechanism coupled to the frame and configured to propel the paving machine forward, and an additive delivery system coupled to the frame. The additive delivery system includes a reservoir configured to transport an additive, a heater configured to heat the additive in the reservoir, and a spray assembly. The paving machine also includes an asphalt delivery system configured to apply asphalt material on the road, and a controller coupled to the driving mechanism, the additive delivery system, and the asphalt delivery system. The controller is configured to activate the driving mechanism to propel the paving machine forward at a speed, activate the additive delivery system to spray the additive on the road, and activate the asphalt delivery system to apply an asphalt layer on the road.

Other aspects of the invention will become apparent by consideration of the detailed description and accompanying drawings.

DETAILED DESCRIPTION

Figure 1:
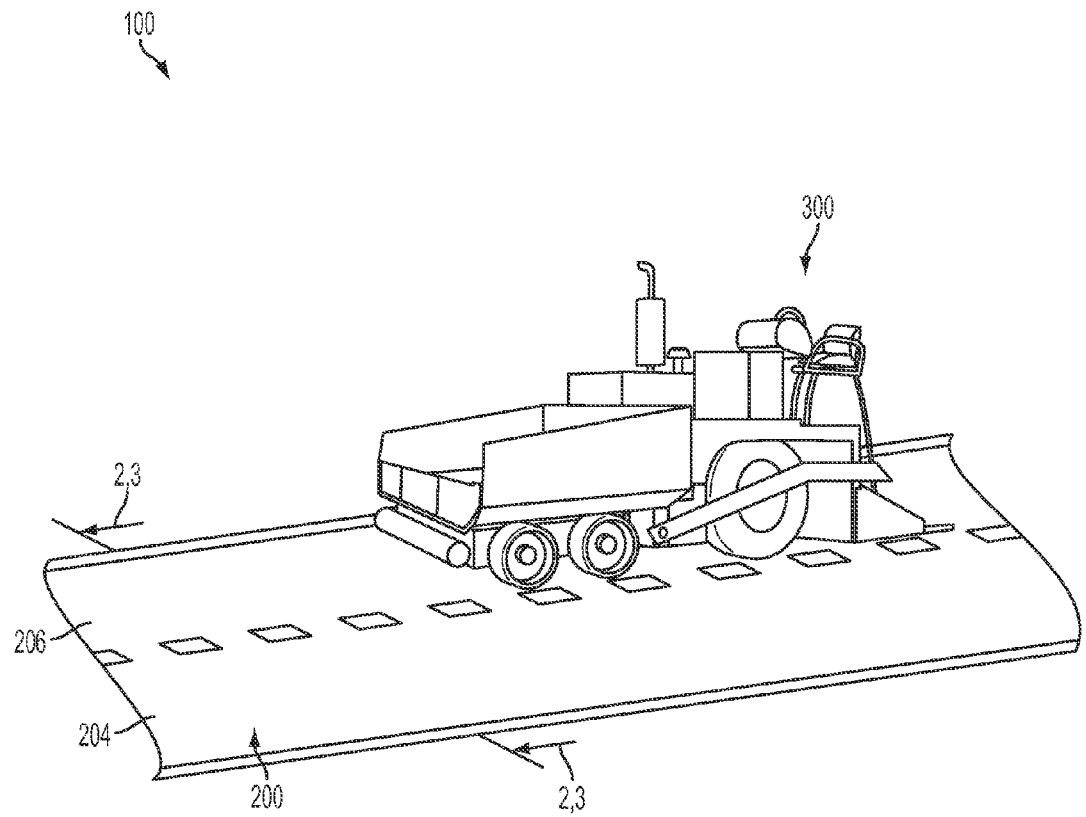
FIG. 1 illustrates a perspective view of a paving system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it would be noted that a plurality of hardware and software based devices, as well as a plurality of different structural components, may be utilized to implement the invention. Furthermore, and as described in subsequent paragraphs, the specific mechanical configurations illustrated in the drawings are intended to exemplify embodiments of the invention. However, other alternative mechanical configurations are possible. For example, "controllers" and "modules" described in the specification can include standard processing components, such as one or more processors, one or more computer-readable medium modules, one or more input/output interfaces, and various connections (e.g., a system bus) connecting the components. In some instances, the controllers and modules may be implemented as one or more of general purpose processors, digital signal processors DSPs), application specific integrated circuits (ASICs), and field programmable gate arrays (FPGAs) that execute instructions or otherwise implement their functions described herein.

FIG. 1 illustrates a paving system 100. The paving system 100 includes a roadway 200 and a paving machine 300. In the illustrated embodiment, the roadway 200 includes a first lane 204 and a second lane 206. In other embodiments, the roadway 200 includes more than two lanes, for example in 3 or 4-lane roadways. In the illustrated embodiment, the roadway 200 is an old roadway that has been previously paved. In such embodiments, the roadway 200 includes old asphalt layers that may be deteriorated. In other embodiments, the roadway 200 may be a new road that is being constructed, or may be an existing road to which new lanes are being added (e.g., expanding a highway from two lanes to four lanes). In such embodiments, the roadway 200 includes a road base course (e.g., rock and other materials on top of which asphalt layers are laid). The paving machine 300 is used to lay asphalt layers on the roadway 200. In some embodiments, one asphalt layer is laid for every lane in the roadway 200. In some embodiments, the paving machine 300 is used to apply more than one asphalt mat (e.g., one asphalt mat may refer to one application of asphalt material with the paving machine 300). For example, in one embodiment, the paving machine 300 may apply one asphalt mat on top of another asphalt mat. In such embodiments, a layer of tack or liquid binding material may be distributed over the roadway 200 after the first asphalt mat is applied such that the two asphalt mats bind together properly.

Figure 2:
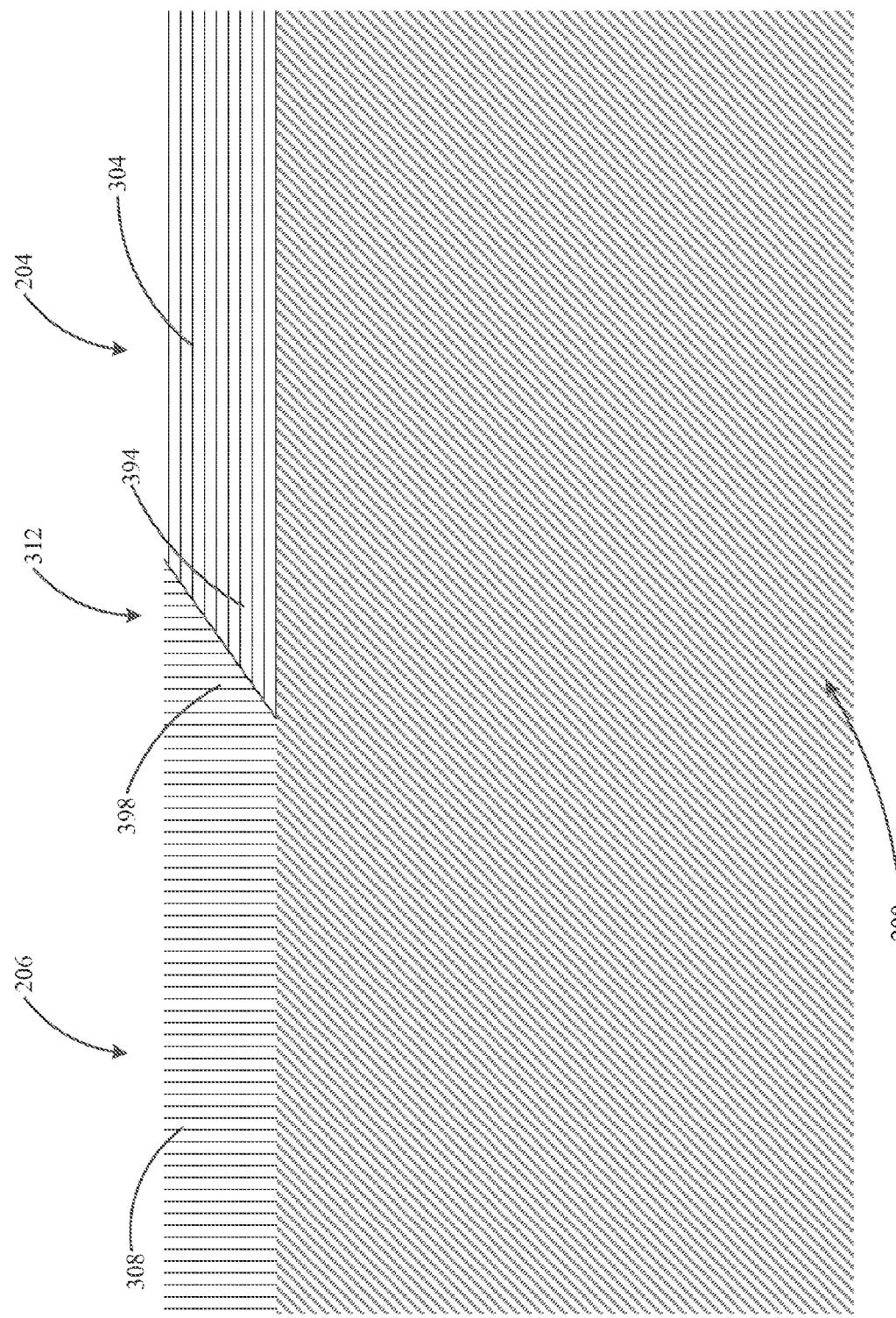
FIG. 2 illustrates a cross-section of the roadway shown in FIG. 1, taken along line 2-2 in FIG. 1, and illustrating one form of cold joint in the roadway.
Figure 3:
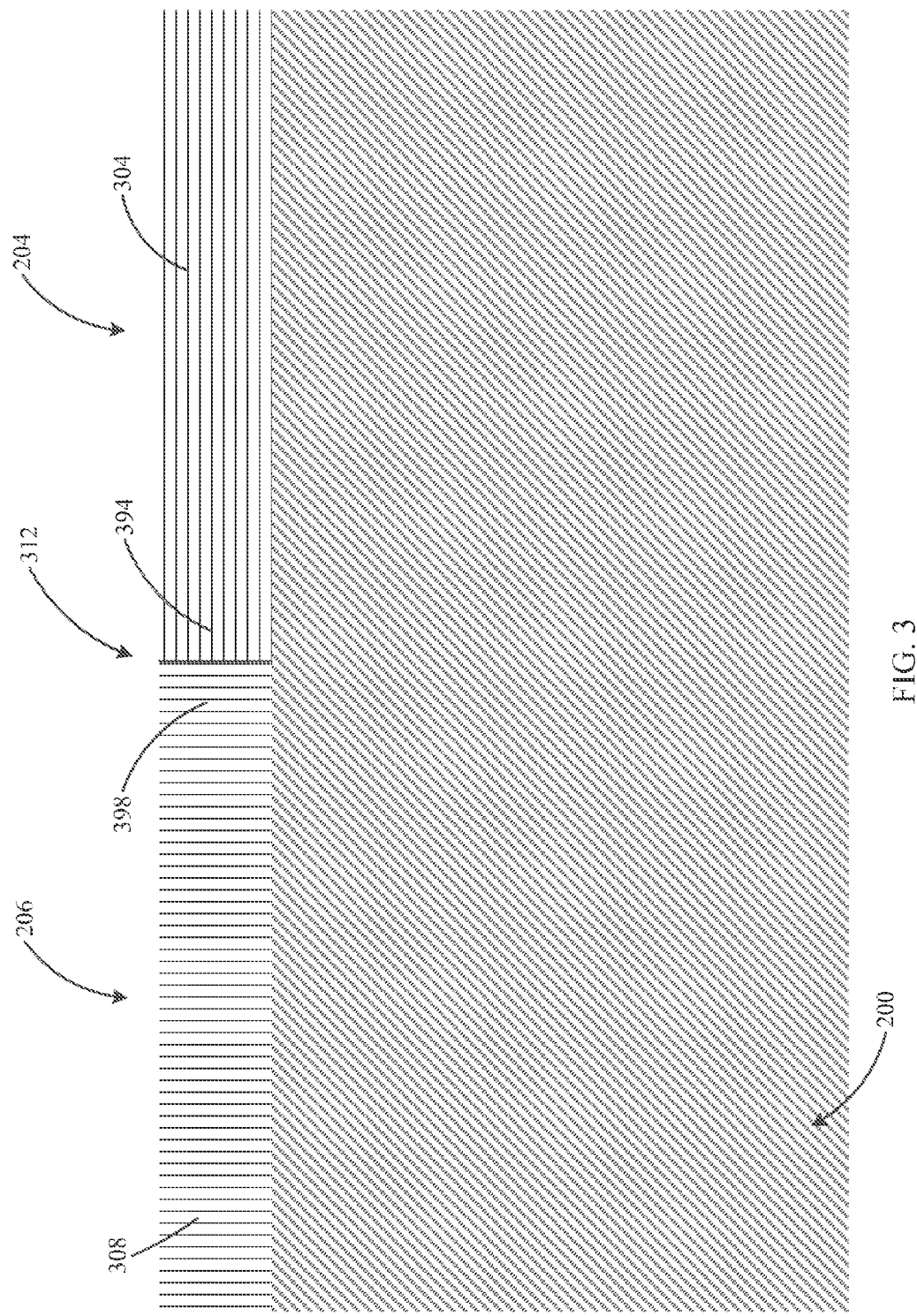
FIG. 3 illustrates a cross-section of the roadway shown in FIG. 1, taken along line 3-3 of in FIG. 1, and illustrating another form of cold joint in the roadway.

As shown in FIG. 2, the paving machine 300 lays a first asphalt layer 304 over the entire length of the first lane 204 of the roadway 200, and then the paving machine 300 lays a second asphalt layer 308 over the entire length of the second lane 206 of the roadway 200. By paving in such a manner and maintaining at least one lane 204, 206 open, sometimes complete road closings may be avoided. A section in the middle of the roadway 200 forms a longitudinal asphalt joint 312 (e.g., a seam) between the first asphalt layer 304 and the second asphalt layer 308. The asphalt joint 312 is formed by a first side edge 394 of the first asphalt layer 304 and a second side edge 398 of the second asphalt layer 308 that is adjacent and abutting the first side edge 394. In the illustrated embodiment, the asphalt joint 312 is a tapered joint because the first asphalt layer 304 and the second asphalt layer 308 join together at an angle. In other embodiments, as shown in FIG. 3, the asphalt joint 312 may be a vertical joint in which the first asphalt layer 304 and the second asphalt layer 308 join together at a vertical angle. In some embodiments, the second asphalt layer 308 is applied a considerable amount of time after the first asphalt layer 304 has been applied. In such embodiments, the first asphalt layer 304 may already be cold and dry by the time the second asphalt layer 308 is applied. In such embodiments, the asphalt joint 312 is also referred to as "cold joint" or "cold asphalt joint." Cold asphalt does not adhere well to new, hot asphalt material. Therefore, cold joints in roadways present a major problem in roads because they fracture with more frequency than the rest of the roadway. When a cold joint fractures (e.g., cracks), water may then reach the base of the asphalt layers 304, 308 and cause fractures in other parts of the roadway 200.

Figure 4:
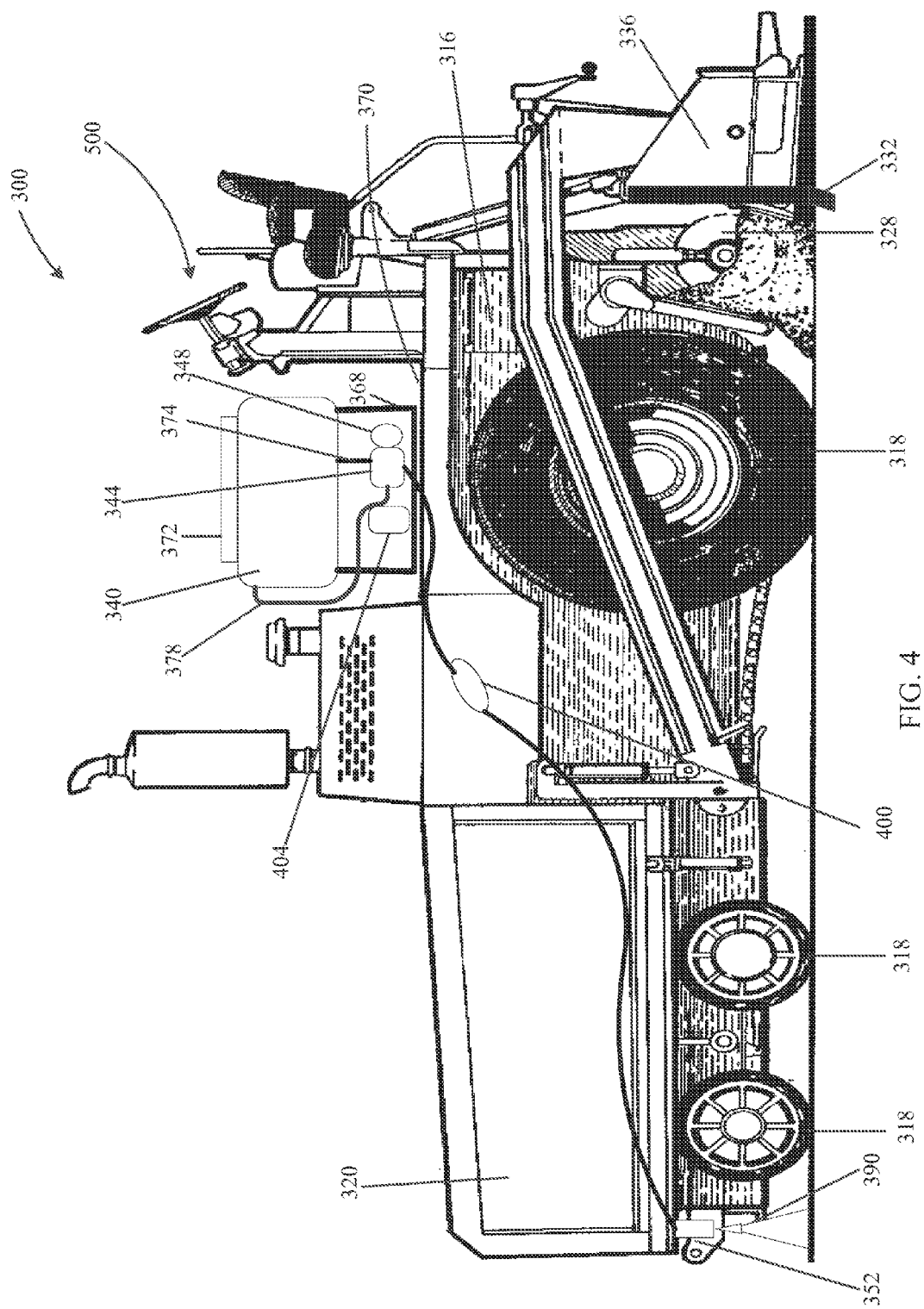
FIG. 4 is a side view of the paving machine of the paving system of FIG. 1.

The paving machine 300 is configured to apply an additive to the roadway 200 or to a portion of an asphalt layer 304, 308 (e.g., to the first side edge 394) to increase compaction, workability, and density of the asphalt material and therefore increase impermeability of the roadway 200. The additive is configured to soften cold (or near cold) asphalt material thus increasing workability of the asphalt material and increase compaction and impermeability on the roadway 200 when laying a second asphalt layer. For instance, the paving machine 300 may apply additive to the roadway 200 if the roadway 200 has been previously paved. In other embodiments, the paving machine 300 applies additive specifically to the asphalt joint 312 to increase compaction and impermeability particularly at the asphalt joint 312. As shown in FIG. 4, the paving machine 300 includes a frame 316, a driving mechanism coupled to the frame 316, an asphalt delivery system supported by the frame 316, an additive delivery system supported by the frame 316, and a control system 500 supported by the frame 316. The driving mechanism includes wheels 318, an engine (not shown), and other components (e.g., a transmission, a fuel tank, axles, and the like) to propel the paving machine 300 forward at a particular speed. In the illustrated embodiment, the paving machine 300 includes six wheels 318 that allow the paving machine 300 to move forward with energy originating from the engine.

The asphalt delivery system lays asphalt layers over the roadway 200. As shown in FIG. 4, the asphalt delivery system includes a hopper 320, tunnels 324 (see FIG. 5), augers 328, an edge shoe 332, and a screed 336. The hopper 320 is positioned on the front portion of the paving machine 300 and receives hot asphalt material. In some implementations, a separate asphalt material supply vehicle (not shown) may travel in front of the paving machine 300 to replenish the asphalt material to the hopper 320 such that the paving machine 300 may continue to lay asphalt on the roadway 200. The hopper 320 is positioned on a front portion of the paving machine 300 such that asphalt material may be replenished through the front of the paving machine 300 and the newly laid asphalt material is not damaged. The asphalt material travels from the hopper 320 through the tunnels 324 to reach the augers 328 toward the back of the paving machine 300. The tunnels 324 include a moving mechanism to transport the asphalt material to the augers 328. For example, the moving mechanism may include one or more conveyor belts that transport the asphalt material from the hopper 320 to the augers 328. The augers 328 expand the width of the paving machine 300 and rotate such that the asphalt material is evenly distributed over the width of the lane 204, 206 being paved.

Once the augers 328 distribute the asphalt material on the roadway 200, the screed 336 smooths the asphalt material over the lane 204, 206. The screed 336 is coupled to the frame 316 by two long screed arms attached to both sides of the paving machine 300. In some implementations, the paving machine 300 includes a screed heater configured to maintain the screed 336 at a predetermined temperature, such that the screed is able to efficiently smooth the asphalt material that has been applied to the roadway 200. A separate vehicle is then used to compact the asphalt material laid and smoothed by the paving machine 300. For example, a roller including one or more heavy weight rollers may be used after the paving machine 300 has laid the asphalt material to compact the asphalt material. To achieve maximum compaction, the roller is moved in a slow but uniform speed behind the paving machine 300. In some implementations, before the paving machine 300 beings to lay the asphalt layers 304, 308 on the roadway 200, the screed 336 is lowered onto a block of the same depth of the asphalt layer 304, 308 that is going to be laid on the roadway 200. Thus, when the paving machine 300 beings to apply the asphalt layers 304,308, the screed 336 is at the correct height for smoothing the asphalt material.

As explained above, in some implementations, the paving machine 300 lays the first asphalt layer 304 over the first lane 204 of the roadway 200 and the paving machine 300 then lays the second asphalt layer 308 over the second lane 206 creating the asphalt joint 312. When laying the first asphalt layer 304, the paving machine 300 uses the edge shoe 332. The edge shoe 332 attaches to the screed 336 and molds the asphalt material distributed by the paving machine 300 to a particular edge form. For example, different edge shoes may be used to form a tapered edge or to form a vertical edge. Based on the specifics of the roadway 200 (e.g., expected traffic load) different edges may be implemented and thus, different edge shoes 332 may be utilized. In other words, the edge shoe 332 is used to hold the asphalt material being applied to the roadway 200 to a particular shape. In some embodiments, the edge shoe 332 is permanently coupled to the screed 336, but may be moved to change the shape to which the asphalt material is molded (e.g., the angle at which the edge shoe 332 is attached may change) or to stop molding the asphalt material (e.g., the edge shoe 332 may be lifted so that the edge shoe 332 does not contact the asphalt material).

Applying an additive to the roadway or to portions of newly laid asphalt may increase the compaction in the asphalt material and impermeability of the roadway 200, both of which increase the longevity of the roadway 200. Therefore, the paving machine 300 includes the additive delivery system to increase the life of the roadway 200 and decrease the repairs needed to maintain the roadway 200 in good condition. The additive may include various binders, oils, and resins, including bitumen, surfactant, polymeric materials, emulsions, asphalt, tar, cement, oil, pitch, or combinations thereof. The additive may be a warm-mix additive typically added to the asphalt at an asphalt mixing plant to decrease the temperature at which the asphalt material needs to be applied on the roadway 200. Warm-mix additives, when added on the roadway 200 or a portion of newly laid asphalt (e.g., on the first side edge 394), increase the workability of the newly laid asphalt, thereby increasing compactability and impermeability of the roadway 200.

Figure 6:
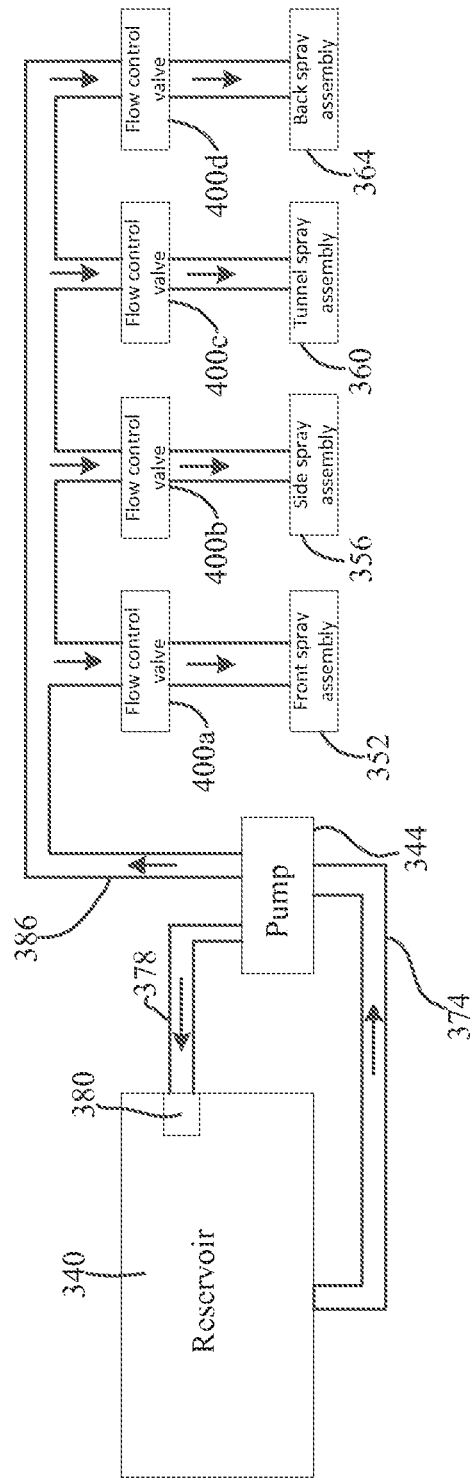
FIG. 6 is a schematic diagram of an additive delivery system of the paving machine of FIG. 4.
Figure 7:
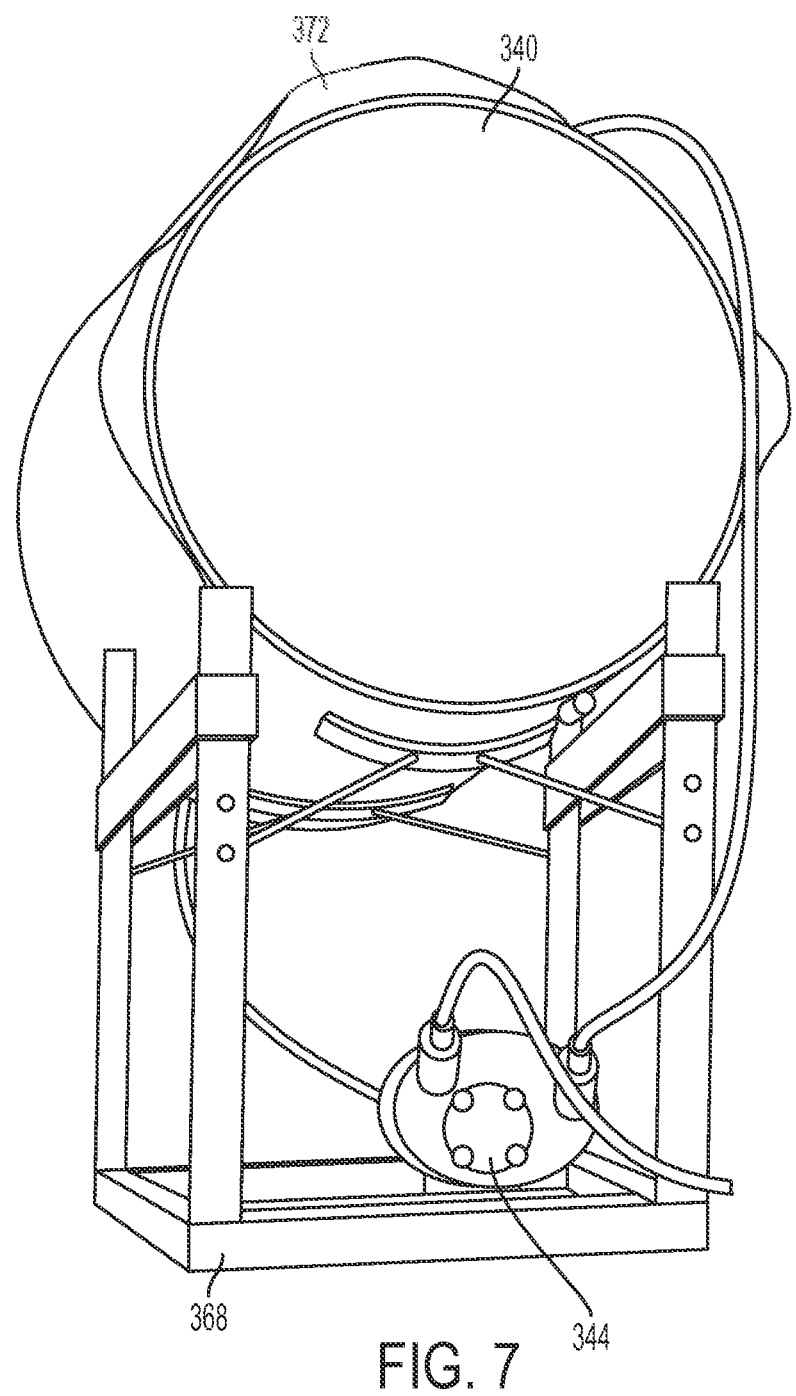
FIG. 7 is a front view of the additive delivery system of the paving machine of FIG. 4.

The additive delivery system, as shown in FIGS. 4, 6, and 7, includes a reservoir 340, a pump 344, a motor 348, and spray assemblies 352, 356, 360, 364. In the illustrated embodiment, the additive delivery system is portable and is supported by a top portion 370 of the paving machine 300. The additive delivery system of the illustrated embodiment is supported by a mount 368. The mount 368 is coupled to the top portion 370 of the paving machine 300 using, for example, bolts, latches, or another suitable locking mechanism. The mount 368 supports the reservoir 340, the pump 344, and the motor 348. The spray assemblies 352, 356, 360, 364 are not coupled to the mount 368 and are instead coupled directly to different parts of the paving machine 300. In some embodiments, the spray assemblies 352, 356, 360, 364 are removable from the paving machine 300 and may be added to the paving machine 300 when the additive delivery system is used. The additive delivery system is thus portable and removable from the paving machine 300.

The reservoir 340 stores the additive to be applied on the roadway 200. The reservoir 340 is generally big enough to accommodate sufficient additive to apply to at least one lane of the roadway 200. In the illustrated embodiment, the additive is a warm-mix additive and the reservoir 340 includes a heater (e.g., a temperature maintainer) 372 to maintain the additive at a constant temperature. Maintaining the additive at a predetermined temperature ensures that the additive remains at a controlled viscosity and can be sprayed onto the roadway 200. The paving machine 300 is configured to distribute different types of additives on the road. The temperature at which the reservoir 340 is maintained and the viscosity of the additive depends on which additive is utilized. Different additives have different viscosities at different temperatures, and the additive is maintained at the viscosity specified by the manufacturer to maintain the additive at viscosity conducive to spraying the additive on the roadway 200. For example, the reservoir 340 may store Rediset® compaction aid. According to manufacturer's specification, Rediset® is typically stored at 60-85 degrees Fahrenheit to have a viscosity between 1700-840 millipascal-seconds. When using different additives, the storage temperature as well as the viscosity associated with the storage temperature may change. In the illustrated embodiment, the heater 372 includes an electric blanket that covers the reservoir 340. The heater 372 receives electrical power through the electrical system of the paving machine 300 (e.g., from an alternator in the paving machine 300).

The heater 372 includes a control that allows a user to set an intensity or a desired temperature for the heater 372. The controls on the heater 372 and the heat provided by the heater 372 may vary based also on ambient temperature. For example, in the illustrated embodiment, the heater 372 includes an electric blanket. The electric blanket provides insulation and heat. When the outside temperature is, for example, 20 degrees Fahrenheit, the electric blanket provides both insulation and heat. However, when the ambient temperature is, for example, 80 degrees Fahrenheit, the electric blanket may only need to provide insulation, but no heat. In other embodiments, the heater 372 includes a barrel heater. A barrel heater includes bands that are wrapped around the reservoir 340 and that include external heating elements. In some situations, the heater 372 may require more power than the power available from the electrical system of the paving machine 300. In such instances, the additive delivery system also includes a generator to provide the necessary power to the heater 372. In other embodiments, the additive delivery system may include a gas heater to heat and/or maintain the additive in the reservoir at a specified temperature. In other embodiments, the additive is not a warm-mix additive and thus, the reservoir 340 does not need to include the heater or temperature maintainer 372.

The reservoir 340 is connected to the pump 344 via an output line 374 and a return (e.g., an input) line 378. In the illustrated embodiment, the output line 374 is connected to the reservoir 340 on a bottom portion of the reservoir 340, and the return line 378 is connected to the reservoir 340 on a top or upper portion of the reservoir 340. The output line 374 is in fluid communication with the reservoir 340 and the pump 344 and transports the additive from the reservoir 340 to the pump 344. The return line 378 is also in fluid communication with the reservoir 340 and the pump 344 and controls the amount of additive returning to the reservoir 340 based on the amount of pressure in the additive delivery system. The reservoir 340 includes a full flow valve 380 that moves at least between an open position in which additive flows back into the reservoir 340 and a closed position in which additive does not flow into the reservoir 340. The full flow valve 380 allows additive to return to the reservoir when the pressure in the additive delivery system exceeds a predetermined threshold. In some embodiments, the full flow valve 380 does not move simply between the open and the closed position. Rather, the full flow valve 380 may slowly move toward the open position as the pressure in the additive delivery system increases and move slowly toward the closed position as the pressure in the additive delivery system decreases.

The pump 344 is a variable speed pump such that the pump 344 is configured to pump additives of various viscosities and rheological characteristics (e.g., viscoelasticity). In the illustrated embodiment, the pump 344 is driven by a hydraulic variable speed motor 348. The hydraulic variable speed motor 348 is connected to the pump 344 via an output shaft. When the output shaft rotates, the pump 344 is activated and additive is transported to the pump 344 and toward the spray assemblies 352, 356, 360, 364. The hydraulic motor 348 may be a gear motor, a vane motor, a piston motor, or a limited rotation actuator. In the illustrated embodiment, the hydraulic motor 348 is part of the paving machine 300 and is used to perform all other hydraulic operations of the paving machine 300. For example, the hydraulic motor 348 may lift and lower the screed 336, control the augers 328, and perform other hydraulics in the paving machine 300. Since the hydraulic motor 348 is part of the paving machine 300 and is used for more than just controlling the pump 344, the type of hydraulic motor 348 is determined based on the specific implementation of the paving machine 300. In other embodiments, the hydraulic motor 348 may be independent of the paving machine 300 and used only for driving the pump 344. The pump 344 and the hydraulic motor 348 determine the pressure in the additive delivery system and, thus, control the amount of additive applied to the roadway 200. The pump 344 may include a user input (e.g., a dial, a set of buttons, and the like) to indicate a relative speed of the pump 344. For example, a dial may indicate operating speeds from 1 to 10, 10 being the fastest operation of the pump 344. Thus, a user may select the speed at which the pump 344 operates using the user input. In some embodiments, the pump 344 operates full-time and the spray assemblies 352, 356, 360, 364 are either activated or deactivated based on if additive is being applied to the roadway 200 and where the additive is applied to the roadway 200. In some embodiments, the pump 344 may be driven with an electric motor instead of the hydraulic motor 348. The electric motor may be driven by a battery included in the paving machine 300 or the electric motor may be driven by a power source external to the paving machine 300. The pump 344 is in fluid communication with the spray assemblies 352, 356, 360, 364 via a supply line 386. The supply line 386 transports the additive from the pump 344 to the spray assemblies 352, 356, 360, 364.

Figure 5:
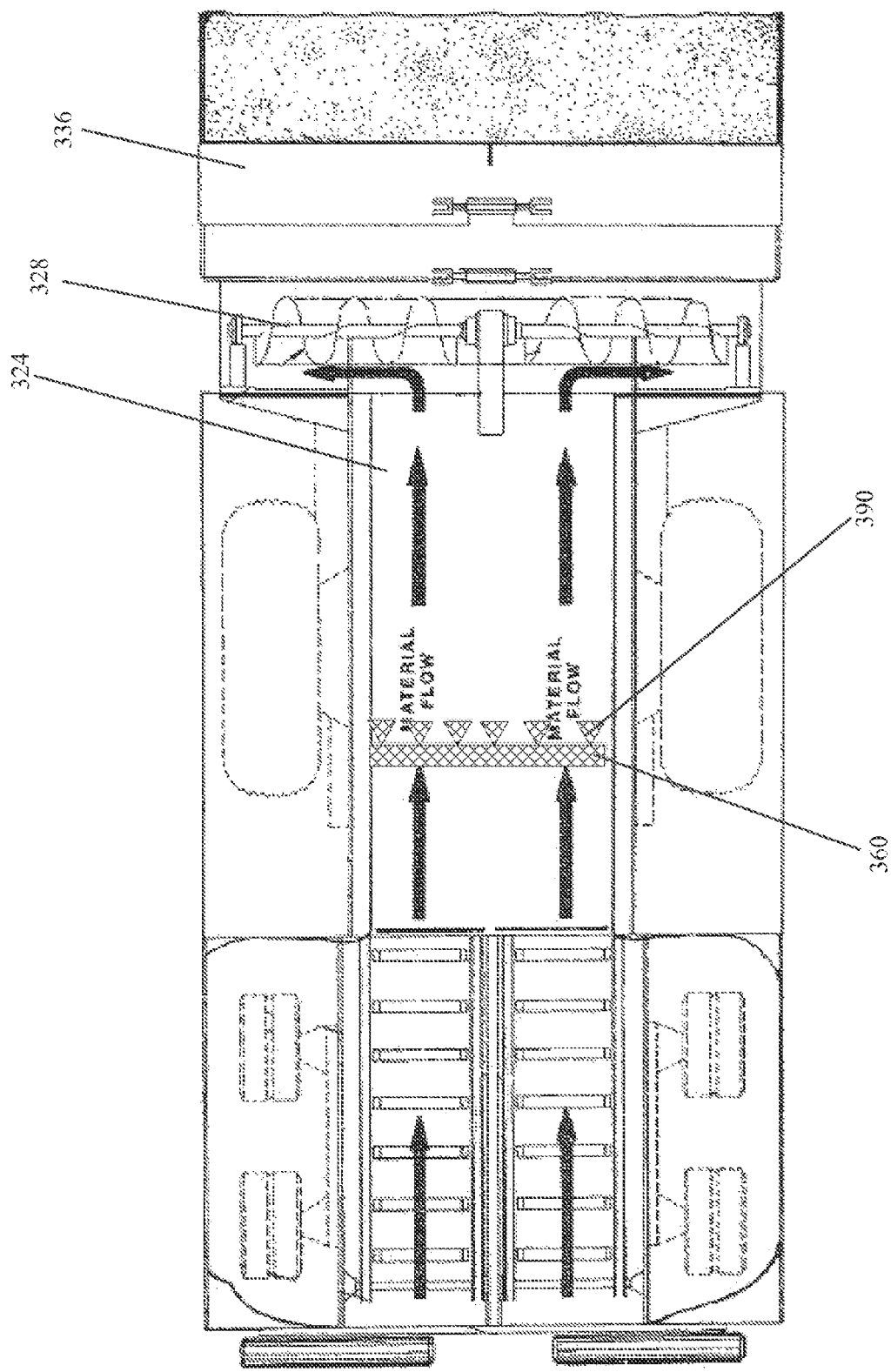
FIG. 5 is an internal view of the paving machine of FIG. 4.

The paving machine 300 includes a front spray assembly 352, a joint or side spray assembly 356, a tunnel spray assembly 360, and a back spray assembly 364. Each of the spray assemblies 352, 356, 360, 364 includes multiple nozzles 390. The number of nozzles 390 on each spray assemblies 352, 356, 360, 364 may vary based on the required width of the additive application. For example, as shown in FIG. 5, the tunnel spray assembly 360 includes six nozzles 390. The spray assemblies 352, 356, 360, 364 are skirted with rubber all around (e.g., 360 degrees around) each of the nozzles 390 to minimize the effects of wind currents on the additive application process.

The front spray assembly 352 is supported by a front portion of the frame 316 of the paving machine 300 and is positioned at an angle greater than zero with respect to the paving machine 300. The front spray assembly 352 applies additive to the roadway 200 before asphalt material is applied to the roadway 200 by the paving machine 300. For example, the front spray assembly 352 may spray additive on a previously laid asphalt mat (e.g., if the paving machine 300 is laying a new asphalt mat on top of a damaged asphalt mat) or on road base course (e.g., if the paving machine 300 is laying a new asphalt mat on a road that has not previously been paved). Applying the additive to the previously-laid asphalt mat increases the workability of the old asphalt material and increases adhesion between the previously-laid asphalt mat and the new asphalt mat. As explained earlier, a layer of tack may also be used to join the previously-laid asphalt mat and the new asphalt mat. The layer of tack is applied before the additive is sprayed onto the roadway 200, such that the additive is applied to the roadway 200 just before the paving machine 300 lays the new asphalt mat. The front spray assembly 352 sprays the additive from the reservoir 340 along the width of the lane 204, 206 of the roadway 200 being paved. In some embodiments, the front spray assembly 352 does not extend the entire width of the lane 204, 206, but rather sprays the additive only in particular areas of the old asphalt mat, such as for example, the region along the first side edge 394 where a cold joint would be formed during application of the second asphalt layer 308. In other embodiments, the front spray assembly 352 extends beyond the width of the lane 204, 206.

The joint spray assembly 356 is supported by a side (e.g., the right or the left side) of the frame 316 of the paving machine 300. The joint spray assembly 356 sprays additive specifically to the asphalt joint 312 created between the first asphalt layer 304 and the second asphalt layer 308. The paving machine 300 applies the first asphalt layer 304 and uses the edge shoe 332 to shape a first side edge 394 of the first asphalt layer 304, as shown in FIGS. 2 and 3. When the paving machine 300 applies the second asphalt layer 308, the edge shoe 332 is not used and a second side edge 398 is formed. The second side edge 398 of the second asphalt layer 308 abuts the first side edge 394 to form the asphalt joint 312. Low compaction at the asphalt joint 312 has been identified as a major issue relating to poor asphalt performance. Applying an additive at the asphalt joint 312, specifically on the first side edge 394, increases the workability of the first side edge 394 and allows at least some of the asphalt material from the first side edge 394 to mix with the newly laid asphalt material of the second side edge 398 of the second asphalt layer 308. Mixing the first asphalt layer 304 and the second asphalt layer 308 at the first side edge 394 and at the second side edge 398 increases the compactability and the density of the asphalt material. Therefore, the impermeability of the roadway 200 is also increased and consequently the chance cracking will occur at the cold asphalt joint is decreased.

The tunnel spray assembly 360 is positioned within the tunnels 324 where the asphalt material travels to the back of the paving machine 300 toward the augers 328. The tunnel spray assembly 360 may be positioned on a roof of the tunnels 324. The tunnel spray assembly 360 applies the additive to the asphalt material before the asphalt material reaches the augers 328 and is laid on the roadway 200. Therefore, when the asphalt material is laid on the roadway 200, the asphalt material consists of a mix of asphalt material processed at an asphalt plant and additives added on site on the paving machine 300. In embodiments in which the additives are warm-mix additives, the asphalt material then consists of a mix of asphalt material processed at an asphalt plant and warm-mix additives added on site on the paving machine 300. Adding the additive to the asphalt material directly on site increases the workability of the asphalt material and allows for greater compaction of the asphalt material. Obtaining better compaction of the asphalt material increases the impermeability of the roadway 200 and extends the life of the roadway 200. Adding the additive directly to the asphalt material in the tunnels 324 also facilitates the transportation of the asphalt material from the tunnels 324 to the augers 328.

The back spray assembly 364 is supported by a back portion of the frame 316 of the paving machine 300 behind the screed 336. The back spray assembly 364 applies additive to the newly laid asphalt layer immediately after the screed 336 has smoothed the asphalt material. Adding the additive to the entire asphalt layer again increases the compactability of the asphalt material and, thus, increases the impermeability of the roadway 200. The back spray assembly 364 extends the width of the lane 204, 206 being paved. In some embodiments, the back spray assembly 364 extends beyond the width of the lane 204, 206. In yet other embodiments, the back spray assembly 364 does not extend the full width of the lane 204, 206 being paved and only applies the additive on specific portions of the roadway 200.

Each of the spray assemblies 352, 356, 360, 364 is in fluid communication with a flow control valve 400a-d. The flow control valves 400a-d control how much additive is delivered to each of the spray assemblies 352, 356, 360, 364 from the supply line 386. For example, the more open a flow control valve 400 is, the more additive that is delivered to the associated spray assembly 352, 356, 360, 364 and thus, the more additive that is applied to the roadway 200 and/or the asphalt material in the area associated with the specific spray assembly 352, 356, 360, 364. Similarly, if a particular spray assembly 352, 356, 360, 364 is not to be activated or used, the flow control valve 400 associated with that particular spray assembly 352, 356, 360, 364 remains closed and additive is not applied using that particular spray assembly 352, 356, 360, 364. The additive delivery system also includes several other valves between the nozzles 390 and the reservoir 340 to ensure that the additive continues to flow in the appropriate direction (i.e., from the reservoir 340 to the nozzles 390).

In some embodiments, the additive delivery system also includes an air compressor 404 (see FIG. 4) to pressurize and atomize the additive to ensure that the additive is applied uniformly on the roadway 200. For example, a pressure of 100 pounds per square inch may be used to atomize the additive. However, the pressure necessary to atomize the additive is based on, at least, the rheological characteristics of the additive (e.g., viscoelasticity) and may change based on which additives are used. In the illustrated embodiment, the air compressor 404 is supported by the mount 368 and in fluid communication with the supply line 386. The air compressor 404 can also be used to clear the lines of any remaining additive at the end of a roadway paving process, such that the collection of additive in the supply line 386 does not cause damage to any conduits delivering additive to the roadway 200.

Figure 8:
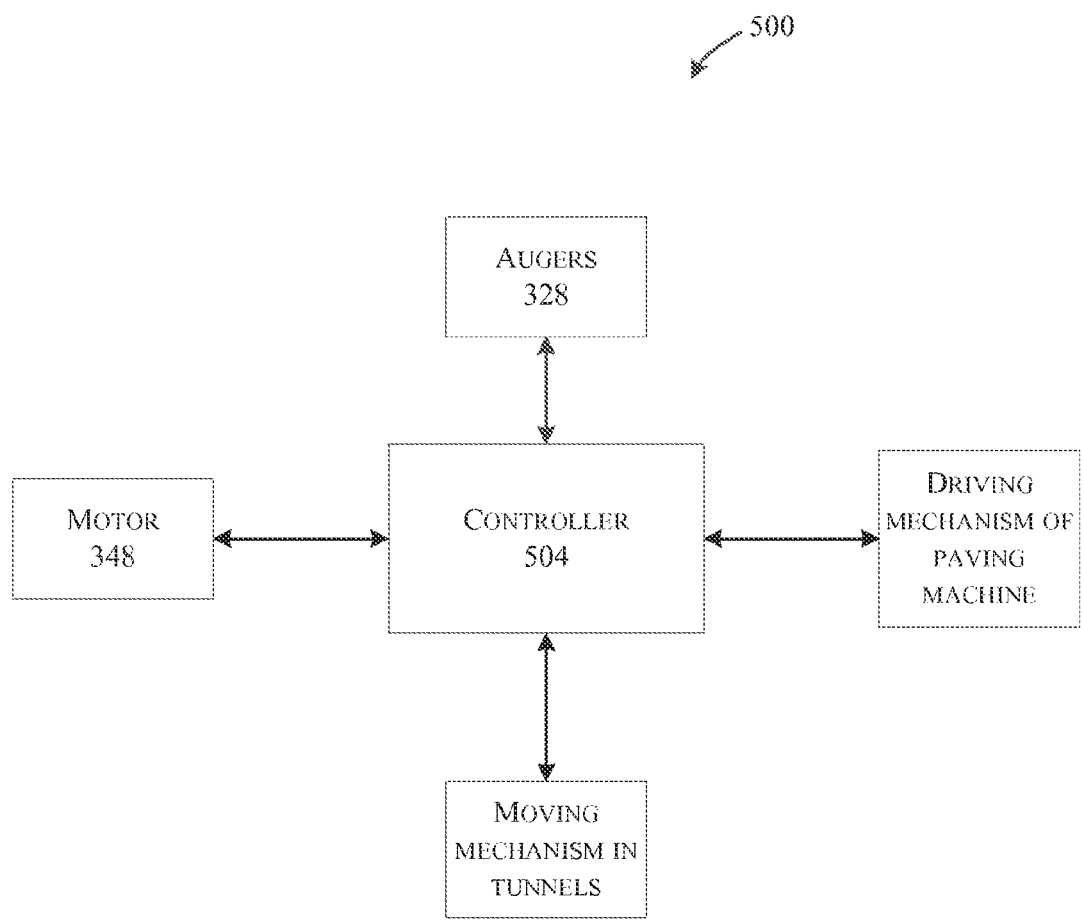
FIG. 8 is a schematic diagram of a control system of the paving machine of FIG. 4.

As shown in FIG. 8, the paving machine 300 also includes a control system 500. The control system 500 may be automatic, manually operated by a user, or a combination thereof. The control system 500 includes at least one controller 504 that communicates with various components of the paving machine 300 to control the operation of the same. In some embodiments, the controller 504 may include a combination of many processors and/or controllers. The control system 500 interacts with the driving mechanism of the paving machine 300 and determines, according to, for example, user input indicating whether the driving mechanism of the paving machine is to be activated or not. For example, the controller 504 may activate the driving mechanism such that the paving machine 300 propels forward. In other embodiments, or applications, the controller 504 activates the driving mechanism such that the paving machine 300 moves backward instead of forward. The controller 504 may also receive user input to determine the speed at which the paving machine 300 moves forward.

The control system 500 is also configured to control the asphalt delivery system. The control system 500 is coupled to the augers 328 and the moving mechanism in the tunnels 324 to determine when asphalt material is transported toward the screed 336. The control system 500 ensures coordinates the operation of the augers 328 and the moving mechanism in the tunnels 324 so that asphalt material is applied to the roadway 200 in coordination with the speed at which the paving machine 300 is moving. For example, if the paving machine 300 speeds up, the control system 500 may activate the augers 328 and/or the moving mechanism of the tunnels 324 to deliver more asphalt to the road when the paving machine 300 moves faster. In some embodiments, the control system 500 may also include actuators (e.g., buttons, levers, wheels, switches, and the like) to allow an operator to manually change the operation of the augers 328 and/or the moving mechanism of the tunnels 324. In other embodiments, the operator may be able to select between different modes or densities of asphalt to deliver to the roadway 200 based on the speed of the paving machine 300.

The control system 500 is also coupled to the additive delivery system and controls where and how much additive is delivered. The control system 500 (e.g., the controller 504) may be coupled to the hydraulic motor 348 to determine when the hydraulic motor 348 drives the pump 344. The control system 500 (e.g., the controller 504) may alternatively be coupled only to the pump 344 to determine the operating speed of the pump 344, as described earlier with respect to a user input. Therefore, the control system 500 is configured to activate or deactivate the pump 344 and control when additive is applied to the roadway 200. The control system 500 also controls the pump 344 in coordination with the moving speed of the paving machine 300. An operator may be able to determine an application rate, for example 2 gallons/minute. The control system 500 then activates the pump 344 in a speed necessary to meet the application rate determined by the operator. In some embodiments, a different application rate may be determined for each of the spray assemblies 352, 356, 360, 364 since each of the spray assemblies 352, 356, 360, 364 spray additive over different material. Coordinating the additive delivery system to the moving speed of the paving machine 300 allows for an even application of additive over the roadway 200. For example, if the paving machine 300 stops moving, rather than continuing to apply additive to the same portion of the roadway 200, the control system 500 shuts off or inactivates the additive delivery system.

The control system 500 is configured to control the additive flow based on the speed of the augers 328, the speed of the paving machine 300, and the operation of the pump 344 from the hydraulic motor 348. For example, when the speed of the augers 328 is, for example, 15 revolutions per minute, the pump 344 may be set, through user input or automatic control, to have an application rate of approximately two gallons per minute. As previously discussed, the speed of the paving machine 300 may also affect the application rate of the additive, such that when the paving machine 300 stops, the additive delivery system also stops spraying the additive. However, an operating speed for the pump 344 may also be set, either via user input or automatically, based on the speed of the paving machine 300. For example, if the paving machine 300 is travelling or is set to travel at 40 feet per minute, the pump 344 may be set to an operating speed of, for example, 10 to have an application rate of approximately 2 gallons per minute. However, if the paving machine 300 is travelling or is set to travel at 20 feet per minute, the pump 344 may be set to an operating speed of, for example 5 to have an application rate of approximately 1 gallon per minute. Therefore, the distribution of the additive on the roadway 200 is associated with an average or set speed of the paving machine 300. Since the hydraulic motor 348 may also operate based on the speed of the paving machine 300, the operation of the pump 344 is tied closely to the operation of the paving machine 300 and, in particular, to the operation of the hydraulic motor 348. The control system 500 may also be coupled to the flow control valves 400a-d to determine which spray assemblies 352, 356, 360, 364 are activated at a time. The control system 500 may be coupled to the flow control valves 400a-d via a mechanical method rather than through the controller 504. For example, the control system 500 may include levers that when moved determine which flow control valves 400a-d are in the open position.

In some embodiments, the additive delivery system applies more than one additive to the roadway 200 or to the asphalt material. For example, a first additive is applied using the front spray assembly 352, and a second additive may be applied using the side spray assembly 356. In such embodiments, the paving machine 300 may include a second reservoir to store the second additive. The paving machine 300 may also apply more than two additives, in each case an additional reservoir may be needed to store each of the additives. Applying different additives may allow for customization of the additive. For example, a first additive applied to the roadway 200 with the front spray assembly 352 may provide better adhesion, while a second additive applied to the roadway with the back spray assembly 364 may be better tailored to increase impermeability of the roadway 200.

Figure 9:
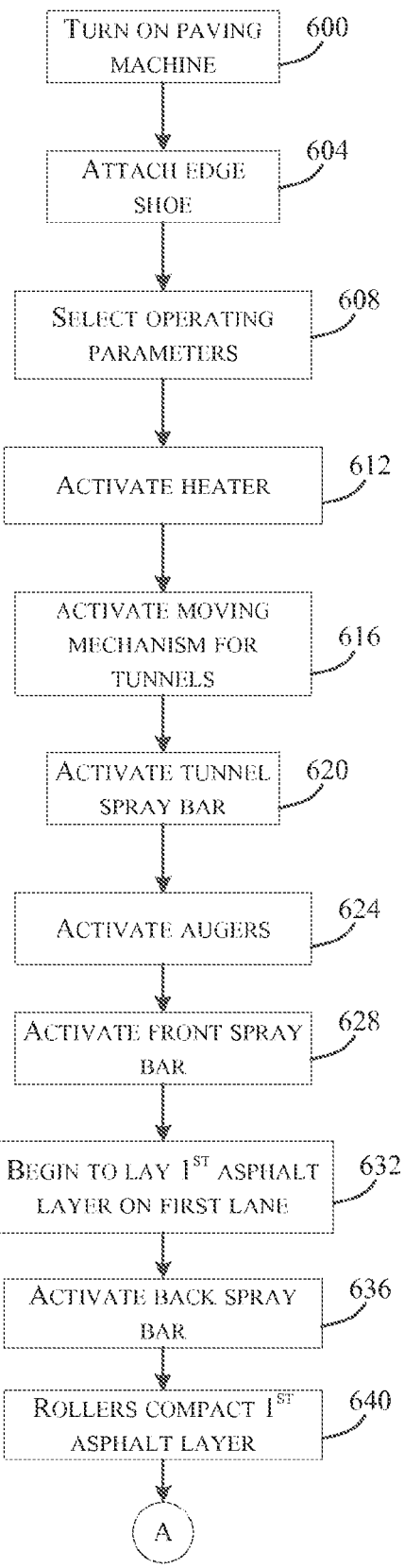
FIGS. 9-10 are flowcharts that illustrate a method of paving a roadway using the paving machine of FIG. 4.
Figure 10:
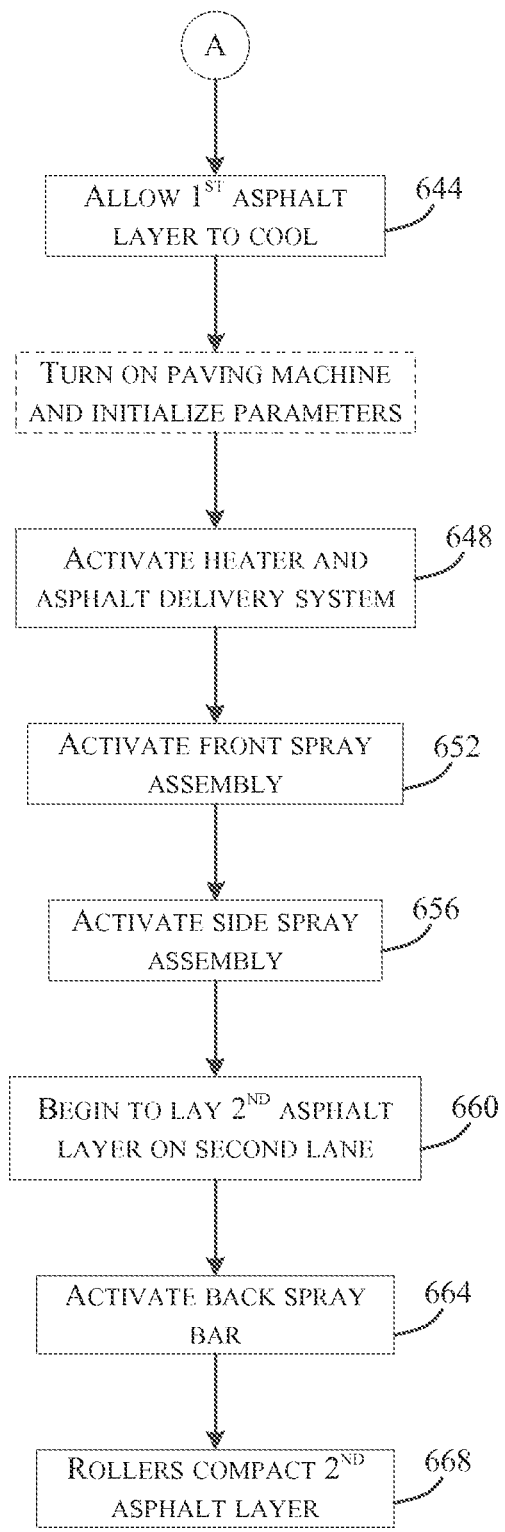

As illustrated in FIGS. 9-10, in operation, the paving machine 300 is used to lay a new asphalt layer on both lanes 204, 208 of the roadway 200. In this particular example, the paving machine 300 is used to lay asphalt mats on top of old and perhaps damaged asphalt mats. As discussed above, the paving machine 300 can also be used to lay new asphalt layers on new roads (e.g., roads that have not been paved before). The paving machine 300 is used to lay the first asphalt layer 304 over the first lane 204 of the roadway 200 (steps 604-636), apply the additive at least on the first side edge 394, and lay the second asphalt layer 308 over the second lane 208 of the roadway (steps 646-668). First at step 600, the paving machine is turned on, for example, with a key. Since the first asphalt layer 304 is laid first, the edge shoe 332 is coupled to the paving machine 300 to shape the first side edge 394 (step 604). At step 608, an operator selects specific parameters for laying the first asphalt layer 304. For example, the parameters may include a desired thickness of the first asphalt layer 304, the application rate of the additive for each of the spray assemblies 352, 356, 360, 364, the temperature to keep the reservoir 340, and the like. In some embodiments, the operator also specifies the speed for the paving machine 300. At step 612, the control system 500 activates the heater 372 to maintain the additive at a specified temperature. Then, the control system 500 activates the asphalt delivery system by activating the moving mechanism for the tunnels 324 (step 616), activating the tunnel spray assembly 360 to begin applying additive to the asphalt material as it travels through the tunnels 324 (step 620), and activating the augers 328 (step 624) to begin transporting the asphalt material from the hopper 320 to the roadway 200. At step 628, the control system 500 activates the front spray assembly 352 to spray additive on the old asphalt mat. The additive, as mentioned above, increases the workability (e.g., increases the density) of the old asphalt material and improves adhesion to the new asphalt mat. The paving machine 300 then begins to lay the first asphalt layer 304 on the first lane 204 of the roadway 200 with the augers 328 and smooth the first asphalt layer 304 with the screed 336 (step 632). The control system 500 then activates the back spray assembly 364 to apply (e.g., spray) additive on the newly-laid asphalt layer (step 636). Asphalt rollers are then driven over the first asphalt layer 304 to compact the first asphalt layer 304 (step 640).

Once the paving of the first lane 204 of the roadway 200 is complete, the first asphalt layer 304 is allowed to cool (step 644). In some implementations, the cooling process may take hours or days. Therefore, the paving machine 300 may be turned off while the first asphalt layer 304 cools. When the first asphalt layer 304 has cooled down, paving of the second lane 206 of the roadway 200 begins. If the cooling of the first asphalt layer 304 requires more than a few minutes and the paving machine 300 is turned off, the paving machine 300 is turned back on for the paving of the second lane 206 of the roadway 200. Similarly, the operator may select the operating parameters again. It is also important to note that when paving the second lane 206 of the roadway 200, the edge shoe 332 is detached from the paving machine 300. Once the paving machine 300 has been turned back on and the operating parameters have been selected, the control system 500 activates the heater 372 as well as the asphalt delivery system (step 648). Then, the control system 500 activates the front spray assembly 352 (step 652). The control system 500 also activates the side spray assembly 356 to apply (e.g., spray) additive on the first side edge 394 of the first asphalt layer 304 (step 656). The paving machine 300 then begins to apply the second asphalt layer 308 on the second lane 206 of the roadway 200 (step 660). As the paving machine 300 moves forward and continues to lay the second asphalt layer 308, the control system 500 activates the back spray assembly 364 to apply additive to the second asphalt layer 308 (step 664). Finally, at step 668, the rollers are driven over the second asphalt layer 308 to compact the second asphalt layer 308 and the asphalt joint 312, thus completing the paving of the roadway 200.

Thus, the invention provides, among other things, a method and machine for implementing such method, of paving a roadway that includes applying an additive to the roadway and/or to a portion of a first asphalt layer. Various features and advantages of the invention are set forth in the following claims.

What is claimed is:

1. A method of paving a roadway including a first lane and a second lane adjacent the first lane, the method comprising:
   applying, with a paving machine, a first asphalt layer over the first lane of the roadway, the first asphalt layer including a first side edge defining a portion of a joint between the first asphalt layer and a second asphalt layer;
   smoothing, with the paving machine, the first asphalt layer on the first lane of the roadway;
   applying, with the paving machine, a warm-mix additive on the first side edge to soften the first side edge;
   applying, with the paving machine, the second asphalt layer over the second lane of the roadway, the second asphalt layer including a second side edge abutting the first side edge such that the second side edge mixes with the first side edge, the first side edge and the second side edge forming the joint between the first asphalt layer and the second asphalt layer; and smoothing, with the paving machine, the second asphalt layer on the second lane.

2. The method of claim 1, further comprising spraying, with the paving machine, a second additive on the second asphalt layer on the second lane.

3. The method of claim 1, further comprising allowing the first asphalt layer to cool before applying the warm-mix additive on the first side edge.

4. The method of claim 1, wherein applying the warm-mix additive on the first side edge includes activating a pump according to a speed of the paving machine to spray the warm-mix additive on the first side edge.

5. The method of claim 1, wherein applying the warm-mix additive on the first side edge includes activating spray nozzles of the paving machine to spray the warm-mix additive on the first side edge.

6. The method of claim 1, further comprising spraying the warm-mix additive to asphalt material in the paving machine used to apply the second asphalt layer before the second asphalt layer is applied on the second lane of the roadway.

7. The method of claim 1, wherein the joint is a tapered cold asphalt joint.

8. The method of claim 1, wherein the joint is a vertical cold asphalt joint.

9. The method of claim 1, further comprising, heating the warm-mix additive before the warm-mix additive is applied to the roadway.

10. A method of paving a roadway, the method comprising: storing a warm-mix additive on a paving machine;
heating the warm-mix additive such that the warm-mix additive is maintained at a specified temperature range;
spraying, with a paving machine, the warm-mix additive on the roadway;
applying, with the paving machine, an asphalt layer over the roadway; and
smoothing, with the paving machine, the asphalt layer on the roadway;
wherein the asphalt layer is a first asphalt layer, the first asphalt layer having a side edge defining a portion of an asphalt joint between the first asphalt layer and a second asphalt layer, and wherein spraying the warm-mix additive on the roadway includes spraying, with the paving machine, the warm-mix additive to the side edge to soften the side edge;
and applying the second layer over a second lane of the roadway, the second asphalt layer including a side edge abutting the first side edge such that the second side edge mixes with the first side edge.

11. The method of claim 10, further comprising propelling the paving machine forward at a speed, and wherein spraying the warm-mix additive on the roadway includes activating a pump according to the speed of the paving machine to spray the warm-mix additive on the roadway using a spray assembly coupled to the paving machine.

12. The method of claim 10, further comprising, spraying the warm-mix additive to asphalt material transported in the paving machine before applying the asphalt material on the roadway.

13. The method of claim 10, further comprising smoothing, with the paving machine, the second asphalt layer on the roadway.

14. The method of claim 13, further comprising, spraying the warm-mix additive to the second asphalt layer after the second asphalt layer is smoothed by the paving machine.

15. The method of claim 10, wherein spraying the warm-mix additive on the roadway includes spraying, with the paving machine, the warm-mix additive on the roadway before the asphalt layer is applied to the roadway.

* * * * *